United States Patent [19]

Cooper

[11] Patent Number: 5,208,937
[45] Date of Patent: May 11, 1993

[54] APPARATUS FOR LAUNCHING PIGS INTO PIPELINES

[76] Inventor: Clarence G. Cooper, 1417 Bernice St., Morgan City, La. 70380

[21] Appl. No.: 634,618

[22] Filed: Dec. 27, 1990

[51] Int. Cl.⁵ .............................................. B08B 9/04
[52] U.S. Cl. .................................. 15/104.062; 134/8; 138/89; 292/256.5; 221/268
[58] Field of Search ...................... 15/104.061, 104.062, 15/3.5, 3.51; 221/36, 268, 279; 166/75.1, 153, 170, 177; 220/355; 141/71, 331; 134/8; 292/256.5, 256.71; 285/23; 138/89

[56] References Cited

U.S. PATENT DOCUMENTS

| | | | |
|---|---|---|---|
| 278,612 | 5/1883 | Sharp | 15/104.062 |
| 1,006,261 | 10/1911 | Mueller . | |
| 1,715,442 | 6/1929 | Weis | 15/3.5 |
| 2,028,779 | 1/1936 | Howe et al. . | |
| 2,575,146 | 11/1951 | Thomas . | |
| 2,814,507 | 11/1957 | Lattimore | 285/23 |
| 2,818,592 | 1/1958 | Scaramucci . | |
| 2,977,617 | 4/1961 | Willis . | |
| 3,011,196 | 12/1961 | Glover | 15/104.062 |
| 3,063,079 | 11/1962 | Bergman et al. . | |
| 3,531,813 | 10/1970 | Hurst | 15/104.062 |
| 3,565,689 | 2/1971 | Lowe et al. | 15/104.062 |
| 3,631,555 | 1/1972 | Hurst et al. | 15/104.062 |
| 3,643,489 | 2/1972 | Davis et al. | 15/104.062 |
| 3,809,113 | 5/1974 | Grove et al. . | |
| 3,848,621 | 11/1974 | Dickenson . | |
| 4,961,600 | 10/1990 | Points et al. | 292/256.71 |
| 4,974,277 | 12/1990 | Casella | 15/3.5 |

FOREIGN PATENT DOCUMENTS 309344 4/1929 United Kingdom ........... 15/104.062

Primary Examiner—Edward L. Roberts
Attorney, Agent, or Firm—William W. Stagg

[57] ABSTRACT

An apparatus for inserting compressible pigs into a pipeline. The apparatus includes a conical chamber that fits into the end of the pipeline. A plurality of spring tensioned hooks hold the conical chamber in place. The pig is inserted into the conical chamber, a cover having a threaded rod is then secured to the chamber and the pig is pushed through the chamber into pipeline by turning the threaded rod.

8 Claims, 5 Drawing Sheets

APPARATUS FOR LAUNCHING PIGS INTO PIPELINES

FIELD OF INVENTION

The present invention generally relates to pipeline cleaning and, more particularly, is concerned with apparatus and method for inserting cleaning swabs or pigs into the pipeline during the construction of oil and gas pipelines.

BACKGROUND OF INVENTION

During the construction of a pipeline, and sometimes during the serviceable life of a pipeline, it is necessary to have the lines cleaned and pressure tested to ensure their safety, integrity and reliability. This is particularly true in the construction of pipelines used for the transportation of oil, gas and petroleum products Pipelines used in the petroleum industry vary greatly in size. Typical lines range from 4 inches in diameter to over 42 inches in diameter. They are constructed in both onshore and offshore locations. During the construction, before the pipelines can be used, they must be cleaned and tested. The lines are typically cleaned by washing out the lines with water and detergent and then inserting and forcing through the line an oversized pig or swab.

The compressible pigs are generally made of plastic, foam with smooth exterior surfaces, urethane, rubber or the like. Forcing the pig through the line by either air or hydraulic pressure cleans the line of accumulated unwanted debris left over during construction and locates buckled surfaces or dents in the line. If the pig is forced through the line under hydraulic pressure the air in the line is removed and the line is ready for pressure testing. Additional pigs are then inserted and forced through the line to remove the water after testing making the line ready for use.

The typical pig is generally cylindrical or bullet shaped and is generally 1" to 3" larger in diameter than the inside diameter or I.D. of the pipeline to be cleaned. A problem therefore exists in inserting the oversized pig into the lines in an efficient manner without damaging the pig. The more damage to the pig, the less efficient a cleaning device it becomes.

Conventional methods of inserting pigs or swabs on construction sites include compressing the pig to a narrow diameter by a series of clamps, freezing the pig while still clamped, removing the clamps and inserting the frozen pig into the line. The freezing method requires that refrigeration equipment be available at the construction site which generally is in a remote area. Having sufficient refrigeration equipment available is a particular problem when larger size swabs are required for the swabbing of larger pipeline. Frozen pigs tend to break up as they are pushed through the line. Waiting until the pig thaws would help to eliminate this problem but, often because of hurried work demands a frozen pig is used. Further, freezing tends to deform the pig reducing its cleaning or squeezing properties.

Other methods used to insert pigs include pre-loading a testhead pipe with a pig in the pipe yard. This pre-loaded pipe is brought to the construction site for use. Problems still exist when more than one pig is required in a line. This requires additional pre-loaded test pipes and the additional time involved in removing and reattaching these pre-loaded pipes to the line.

Other means for inserting pigs include specially fabricated pig launchers for each size line. This requires use of an oversize pipe, a reducer, a flange at the pipeline riser end and a blind flange with a pig loading into close line and maintaining it under pressure. These custom-made launchers are expensive and need to be re-built for each particular job. This is due chiefly to the varying pipe sizes and gauges used in pipeline construction. Depending on the job a single pipe overall size can range from standard to double extra heavy. Flanges vary in size to accommodate the various grades of pipes being used.

Other devices for inserting cleaning pigs or balls have been proposed. These include the large sphere handling apparatus as described in U.S. Pat. No. 3,809,113 to Grove, et al which is permanently installed in pipelines for use during the operation phase. Other devices for inserting balls into pipelines during the operation phase have been proposed. These include U.S. Pat. No. 3,063,079 to Bergman, et al, which is a combination valve and cleaning ball launcher. Similar devices include pig ball injector U.S. Pat. No. 2,977,617 to Willis which is a combination pig ball injector and valve mechanism for inserting a cleaning ball while the line is flowing. These devices are incorporated in lines already in use and are flanged into the lines as part of the system.

Various pipeline scraper inserting devices have been employed. These include U.S. Pat. No. 2,575,146 to Thomas, U.S. Pat. No. 2,028,779 to Howe, et al and U.S. Pat. No. 1,006,261 to Mueller. The Thomas patent discloses an inserter for inserting a scraper of a size substantially less than the inside diameter of the pipeline. The Howe, et al patent relates to a device for inserting a mechanical scraper into the line without interrupting the flow of liquid through the line by means of a piston pulley and wench. The Mueller patent discloses forcing a mechanical cleaning device with compressible vane type members into a pipeline by means of a funnel shaped fitting. The Mueller device is sized to fit exactly within the inside diameter of the line to be cleaned. It cannot be used on lines of various wall thicknesses within a pipe diameter range. No means for firmly attaching the fitting to the pipeline are disclosed in the Mueller. Such means are necessary when forcing a compressible urethane pig into the line.

None of the listed inventions provide for the insertion of compressible polyurethane pigs into a pipeline during construction in a convenient, efficient and low cost manner. Consequently, a need exists for an improved method and apparatus for inserting pipeline pigs into a line during the construction phase which will result in greater efficiency, versatility and reliability, and reduce the time, expense and functional problems associated with the aforementioned conventional methods.

SUMMARY OF INVENTION

The present invention provides a pig inserting apparatus and method designed to satisfy the aforementioned needs. The launcher need not be flanged or threaded onto the pipe. Instead it is secured to the existing pipe flange by a series of fastening springs or chains. Freezing and clamping of the compressible pigs is eliminated. Instead a conical chamber is used which gradually reduces the diameter of the pig as it is being forced into the pipeline. It can be manufactured in a variety of general sizes. Because the apparatus is not ordinarily flanged to the pipeline, a single apparatus of a general size can be used on a range of pipelines within that general size to accommodate various pipe wall thicknesses and flange dimensions. The apparatus is portable, versatile and convenient to operate. Its simplicity and portability allows on the job loading of multiple pigs which eliminates the need for pre-loading pipe testheads in the yard.

DESCRIPTION OF PREFERRED EMBODIMENT

Figure 1:
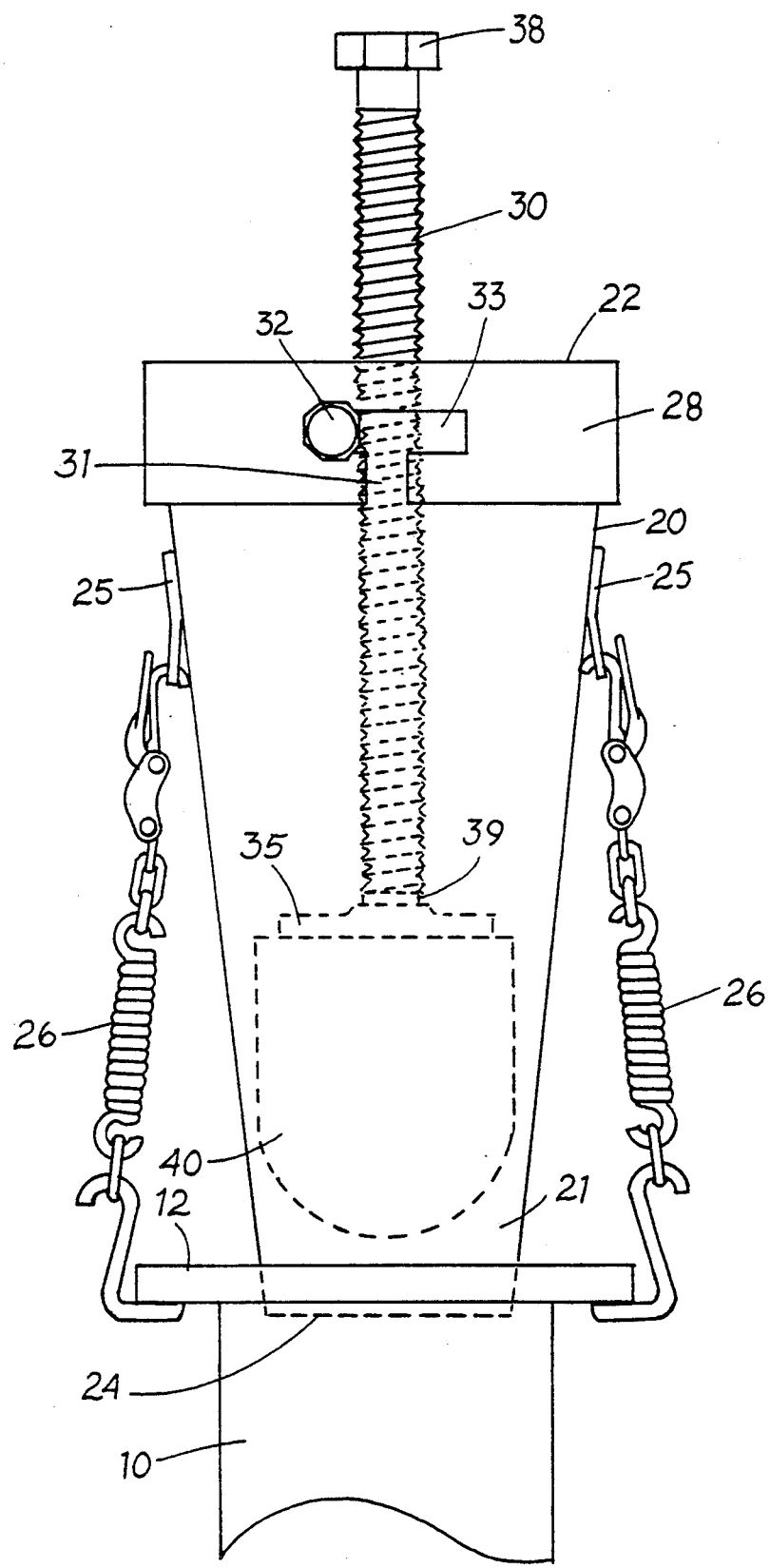
FIG. 1 shows a section of pipeline equipped with the pig launching apparatus.

FIG. 1 shows a pipeline section 10 at the end of which the pig launching apparatus 20 has been attached The apparatus 20 is ideally constructed of stainless steel for its non-corrosive properties but, aluminum, carbon steel or other materials may also be used. The apparatus 20 is comprised of a conical chamber 21 having an inlet end 22 and an outlet end 24. The pipeline section 10 is typically equipped with a flange 12 to which valves and fittings are normally bolted. When cleaning and pressure testing of the pipeline 10 is required during construction of the line, the apparatus 20 is employed to insert or launch compressible pigs 40 into the pipeline 10 for that purpose.

The apparatus 20 is shown attached to the pipeline 10 for insertion of a pig. The outlet end 24 of the apparatus 20 is wedged into the end of the pipeline 10 and the apparatus 20 is held to the flange 12 of the pipeline 10 by a pair of spring type tension hooks 26 fastened to tie loops 25 welded to the outside of the chamber 21. Chains, tie-rods or other fastening means could be substituted for the tension hooks 26.

The apparatus 20 is fitted with a pair of bolts or studs 32 which are fastened to the outside wall of the apparatus 20 at inlet end 22 of the chamber 21. A cover plate 28 is shown having a groove 31 and an inset notch 33 on opposite sides of the cover plate 28. The grooves 31 and notches 33 correspond to the bolts 32 on the apparatus 20 so that the cover plate can be secured over the inlet end 22 of the chamber 21 by fitting the grooves 31 over the bolts 32 and twisting the cover plate 28 so that the notch 33 engages the bolt 32.

The cover plate 28 has a rod guide 36 with a threaded bore 37 to accommodate a threaded rod 30. The rod 30 is attached to a base plate 35 by means of a swivel coupling 39 that allows the rod 30 to turn without rotation of the base plates 35. At the opposite end of the threaded rod is a nut 38 to which a wrench or other turning means may be applied to screwably move the threaded rod 30 and its base plate 35 along inside conical chamber 21.

Figure 2:
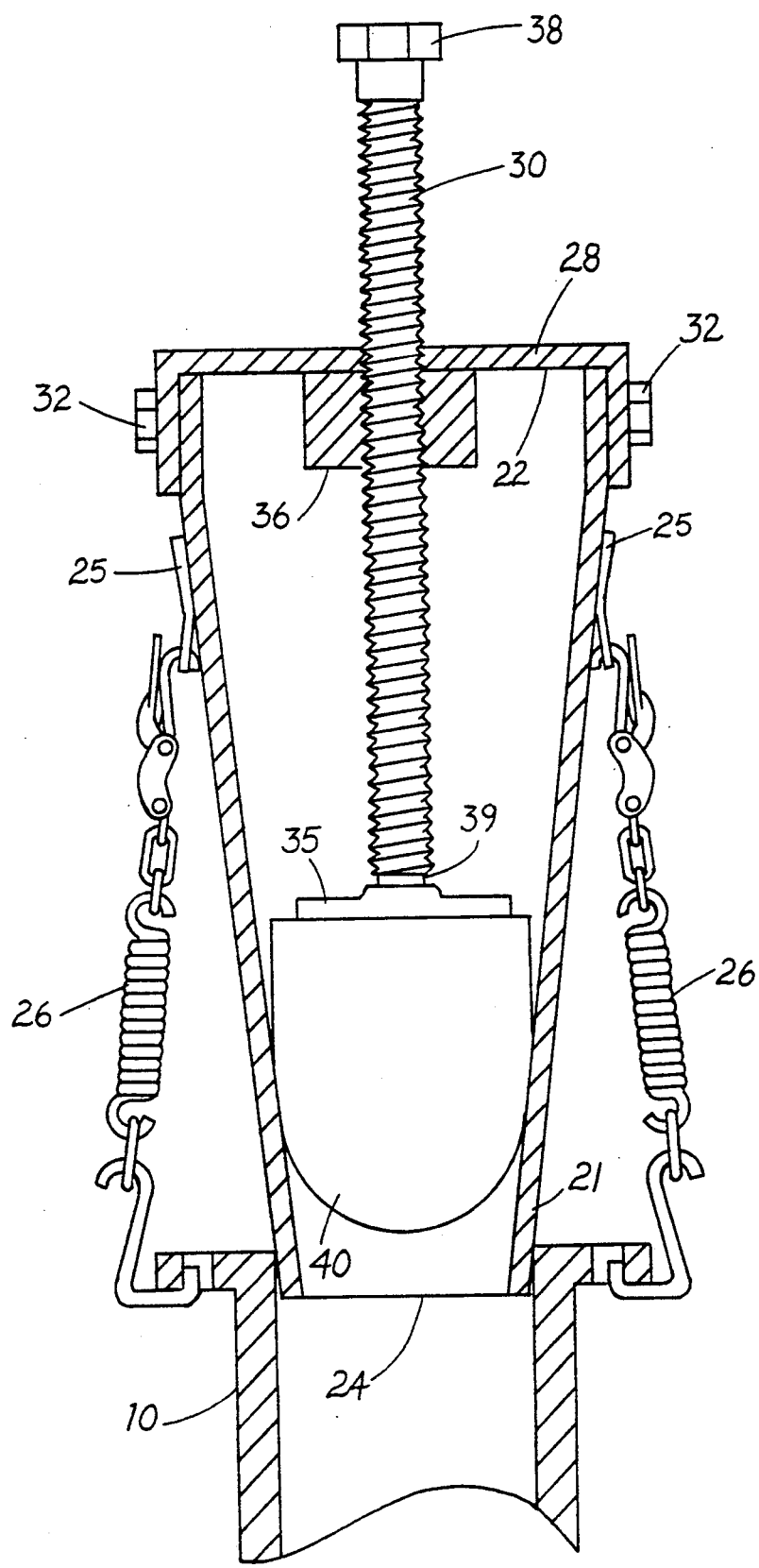
FIG. 2 shows a cross-section of the pig launching apparatus in place on a pipeline section.

FIG. 2 shows a cross-section of the apparatus 20 attached to a pipeline 10. The apparatus comprises a cylindrical conical chamber 21 having an inlet end 22 and an outlet end 24. The inlet end 22 is large enough in diameter to accommodate the insertion of a compressible pig 40. The inside diameter of the outlet end 24 is smaller than the diameter of the pig 40 and the outside diameter of the outlet end 24 is smaller than the inside diameter of the pipeline 10.

Figure 5:
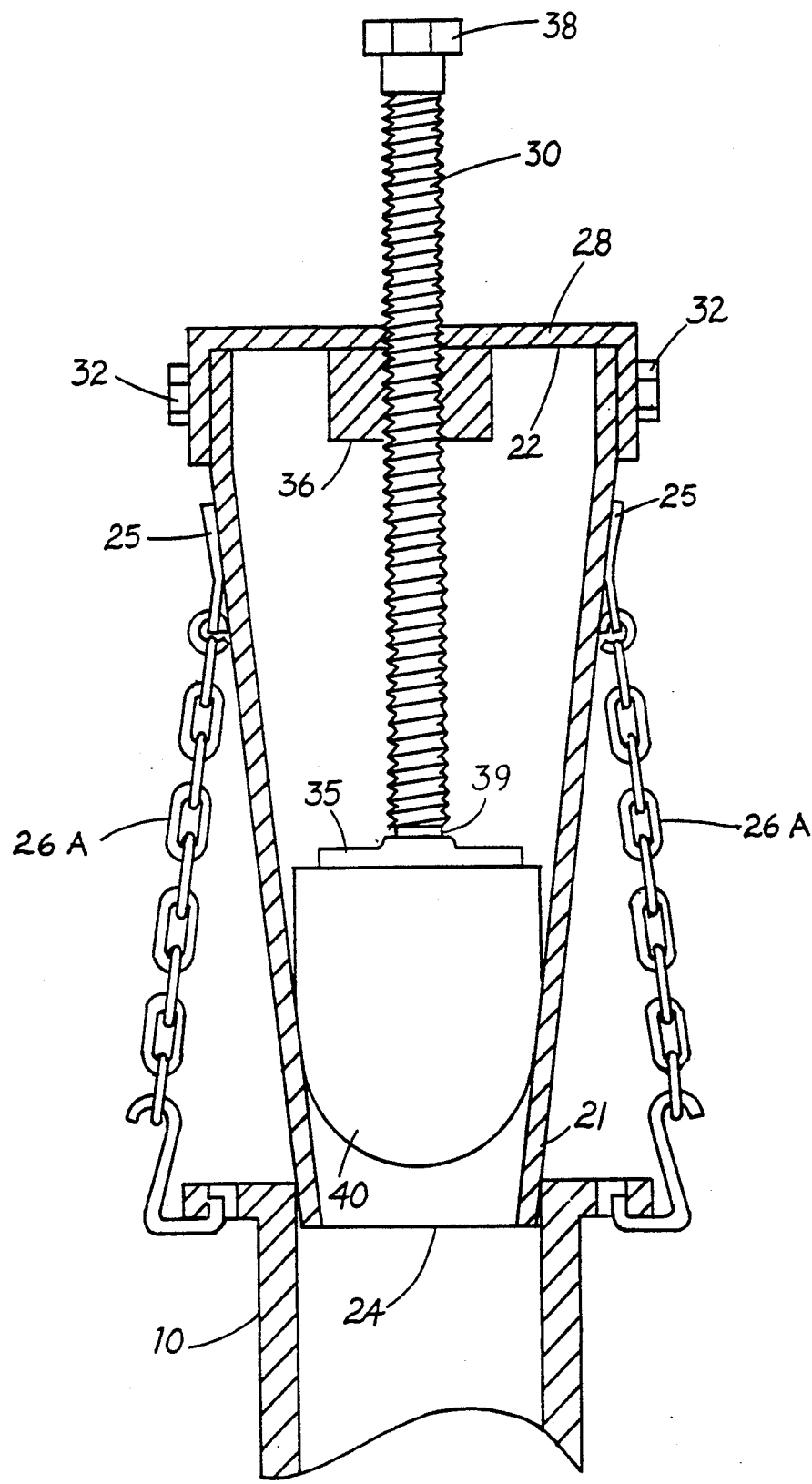
FIG. 5 shows a modified pig launching apparatus with attachment chains.

The apparatus 20 is secured to the flange 12 of the pipeline 10 by a pair of spring type tension hooks 26 attached to the outside wall of the apparatus 20. Additional tension hooks 26 may be added as desired. The tension hooks 26 allow the apparatus 20 to be fitted directly onto the pipeline 10 with the outlet end 24 of the conical chamber 21 wedged inside the pipeline 10. This eliminates the necessity of a flanged coupling. It also eliminates bolting or welding. These hooks allow the apparatus to be quickly installed and removed from the pipeline. Since flanging is not required, the same apparatus within a general size range may be used on pipelines of various pipe wall thicknesses and flange dimensions. Chains 26A as shown in FIG. 5 may be substituted for tension hooks 26 when the apparatus is to be used on larger size pipelines.

The inlet end 22 of the conical chamber 21 is shown fitted with a removable cover plate 28 having a groove 31 and inset notch 33. The cover plate is held in place over the inlet end 22 by twisting the notch 33 around a bolt 32 mounted on the outside of the apparatus 20. Other means for attaching the cover plate 28 such as a screw means may also be employed The cover plate 28 is equipped with a rod guide 36 having a threaded bore 37 to accommodate a threaded rod 30. A base plate 35 having a diameter slightly less than the diameter of the outlet opening 24 or the chamber 21 is attached to the end of the threaded rod on the inside of the chamber 21 by means of a swivel coupling 39. The opposite end of the rod 30 is fitted with a nut 38 or other turning means.

Figure 3:
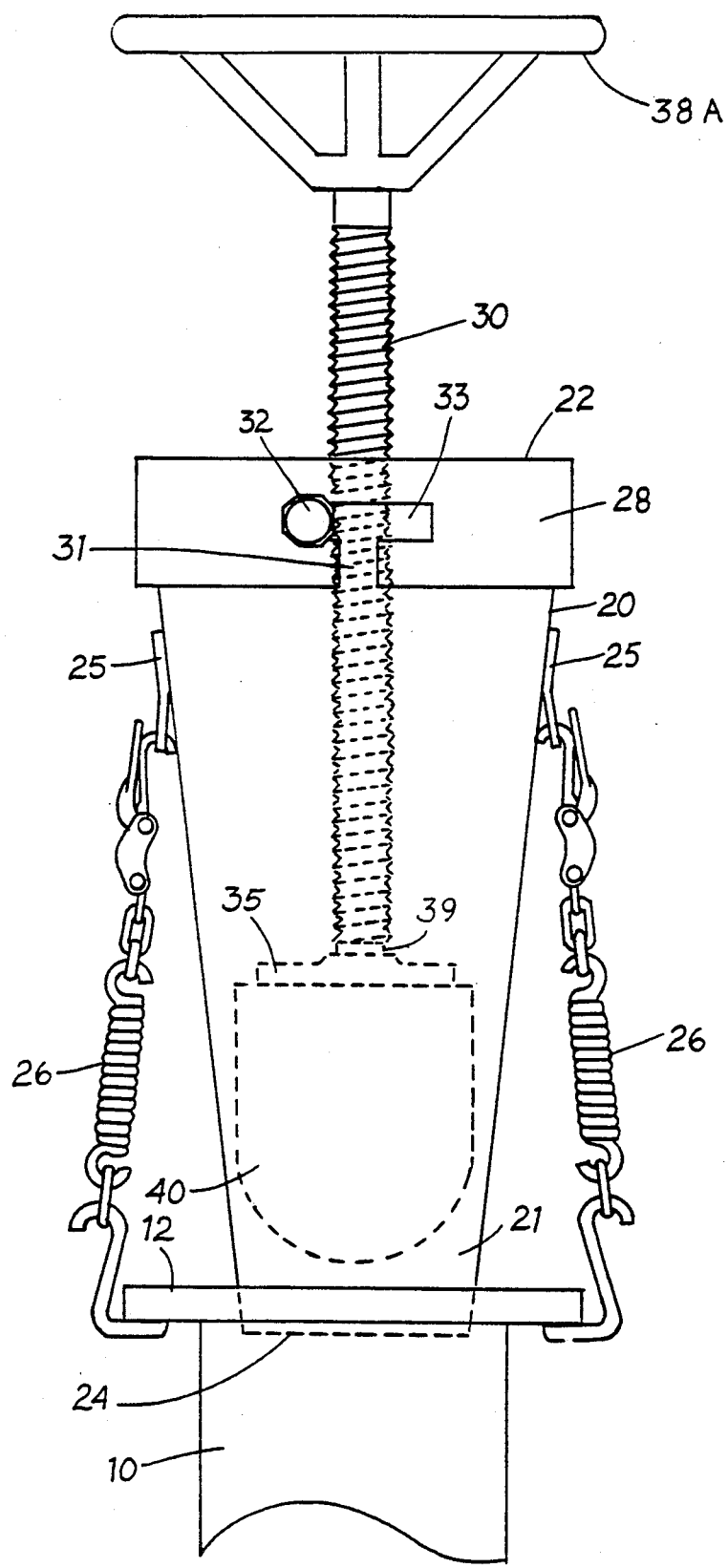
FIG. 3 shows a modified pig launching apparatus having a turning wheel.

Other turning means for the threaded rod 30 is shown in FIG. 3. In FIG. 3, a wheel 38A is attached to the end of the threaded rod 30. When the wheel is 38A is turned, the threaded rod 30 is also turned.

In operation, the apparatus 20 can be manufactured in various sizes to accommodate the pipelines on which it is to be used. The pipe line diameters could range from 4 inches or less to 20 inches and beyond. To use the invention, an apparatus 20 is selected generally for the size range of pipe on which it is to be used. It is then attached to the open end of the pipeline 10 to be cleaned by inserting the outlet end 24 of the apparatus 20 into the pipeline 10. The apparatus 20 is then secured to the pipeline flange 12 by means of the tension hooks 26. A compressible pig 40 having a diameter greater than the inside diameter of the pipeline to be cleaned is placed inside the conical chamber 21 through the inlet end 22. The cover plate 28 is then secured in place over the chamber inlet end 22 by the bolts 32 and the groove 31 and notch 33 as described above. The threaded rod 30 is then turned to screwably move the rod 30 and its attached base plate 35 along the chamber 21 so that base plate 35 engages the pig 40 and pushes it through the chamber 21. During the pushing process the pig is pushed against the inside walls of the chamber 21 and the pig 40 is thereby compressed as the threaded rod 30 and base plate 35 moves the pig 40 through the chamber outlet 24 and into the pipeline 10.

The threaded rod 30 as a means for pushing the pig 40 along the conical chamber 21 so as to compress and insert the pig into the pipeline 10 is not exclusive. Other means such as a hydraulic ram under hydraulic pressure could be substituted for the threaded rod 30 and employed to push the pig through the conical chamber.

This method may be more desirable as the pipeline diameters increase.

Figure 4:
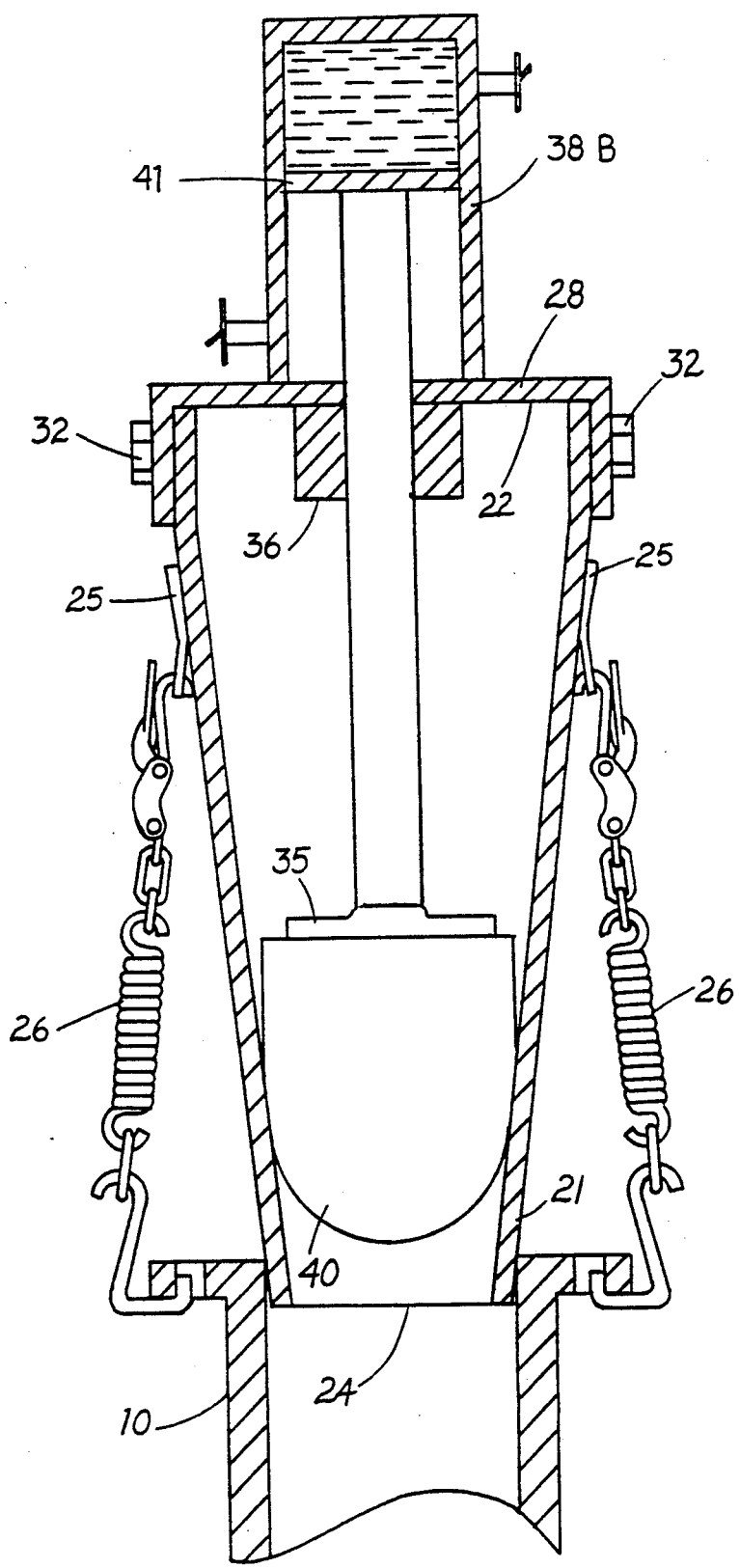
FIG. 4 whose a modified pig launching apparatus having a hydraulic ram.

FIG. 4 shows the apparatus 20 equipped with a hydraulic ram 38B having a hydraulic piston 41 and rod 43 in place of the threaded rod 30 and nut 38.

While the apparatus 20 equipped with the tension hooks 26 is thought to be more versatile in that it eliminates the need of a flanged coupling, the apparatus may be equipped with a flange 46 welded to the apparatus 20 as shown in FIG. 5. Flange 46 is bolted to the pipeline 10 by means of bolts 47.

It is thought that the apparatus for launching pigs into pipelines and many of its intended advantages will be understood from the foregoing description and it will be apparent that various changes may be made in form, construction, and arrangement of the parts thereof without departing from the spirit and scope of the invention or sacrificing all of its material advantages, the form herein before described being merely illustrative of the preferred embodiment of the invention.

I claim:

1. A pig launcher for inserting an oversized compressible pig into a pipeline comprising:
   a) a conical chamber for holding said pig, said conical chamber having an inlet opening of greater diameter than said pig and a narrower outlet opening of lessor diameter than said pig;
   b) means for temporarily attaching said chamber onto the end of said pipeline; and
   c) means for propelling said pig through said conical chamber.

2. A pig launcher as recited in claim 1, further comprising tie loops mounted to the outside of said chamber and wherein said means for temporarily attaching said chamber onto the end of said pipeline is a plurality of chains, said chains being fastened at one end to said tie loops and at the opposite end to said pipeline.

3. A pig launcher as recited in claim 1 wherein said means for propelling said pig through said conical chamber includes:
   a) a removable cover plate for said inlet opening, said cover plate having an opening at its center; and
   b) a hydraulic ram inserted through said cover plate opening.

4. A pig launcher for inserting compressible pigs into a pipeline comprising:
   a) a conical chamber having an inlet opening at one end for inserting said pig into said conical chamber and an outlet opening at the opposite end of said chamber for ejecting said pig from said chamber, said inlet opening having a diameter greater than the diameter of said pig and said outlet opening having a diameter less than the diameter of said pig;
   b) a plurality of spring tension hooks mounted to the outside of said chamber, said hooks being of sufficient strength to firmly fasten said chamber onto the end of said pipeline;
   c) a removable cover plate mounted over said inlet opening of said conical chamber, said cover plate having a threaded bore aligned with the centerline of said conical chamber;
   d) a threaded rod having an inside end and an outside end, screwably engaged with said cover plate through said threaded bore opening in said cover plate so that said inside end of said threaded rod is inside said conical chamber and said outside end of said threaded rod is outside said conical chamber;
   e) a base plate swivably mounted to the inside end of said threaded rod; and
   f) a means for turning said threaded rod whereby said threaded rod and said base plate move along the centerline of said conical chamber.

5. A pig launcher as recited in claim 4 wherein said means for turning said threaded rod is a nut mounted to the outside end of said threaded rod.

6. A pig launcher as recited in claim 4 wherein said means for turning said threaded rod is a wheel mounted to the outside end of said threaded rod.

7. A pipeline compressible pig launcher comprising:
   a) a conical chamber for holding a pig, said conical chamber having an inlet opening and a narrower outlet opening;
   b) a plurality of hooks;
   c) a plurality of longitudinal springs, said springs being attached at one end to said chamber and at the other end to one of said hooks for attaching said chamber onto said pipelines; and
   d) means for propelling said pig through said conical chamber.

8. A pig launcher for inserting an oversized compressible pig into a pipeline comprising:
   a) a conical chamber for holding said pig, said conical chamber having an inlet opening of greater diameter than said pig and a narrower outlet opening of lessor diameter than said pig;
   b) means for temporarily attaching said chamber onto the end of said pipeline;
   c) a removable cover plate for said inlet opening, said cover plate having a threaded bore at its center;
   d) a threaded rod screwably mounted to said cover plate through said threaded bore;
   e) a base plate swivably mounted on the end of said threaded rod; and
   f) means for turning said threaded rod.

* * * * *